(No Model.) 2 Sheets—Sheet 1.
J. M. HELFENSTEIN & W. K. HOLMES.
TIME INDICATOR AND REGISTER.
No. 564,072. Patented July 14, 1896.
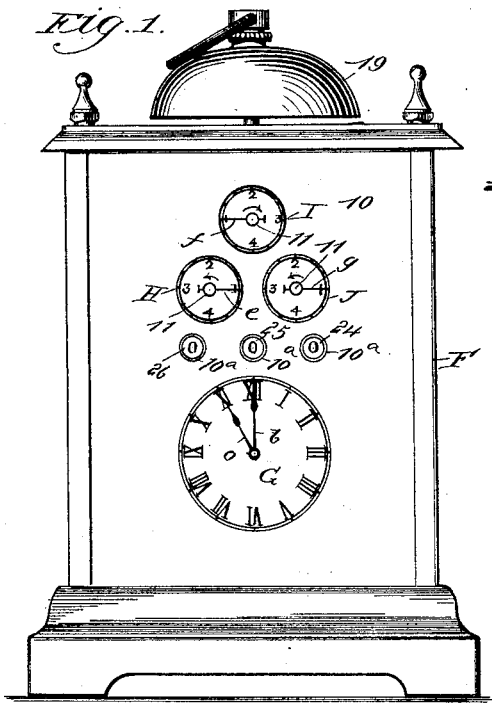
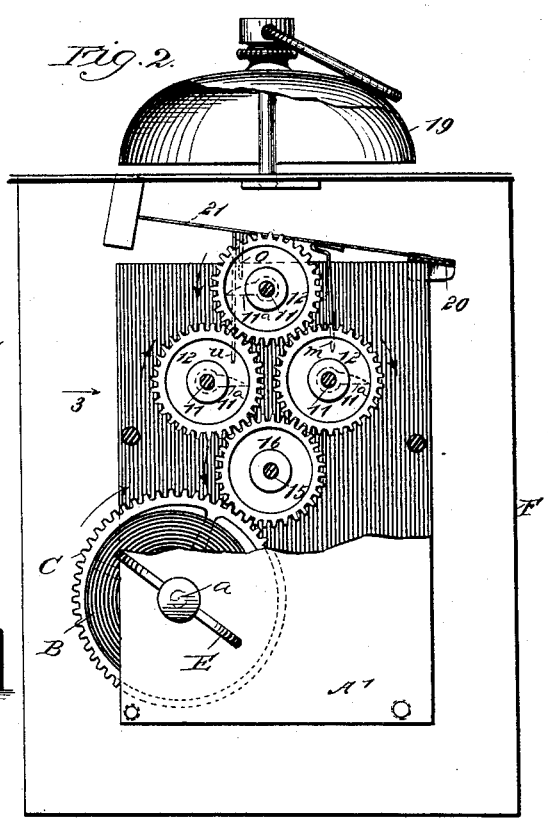
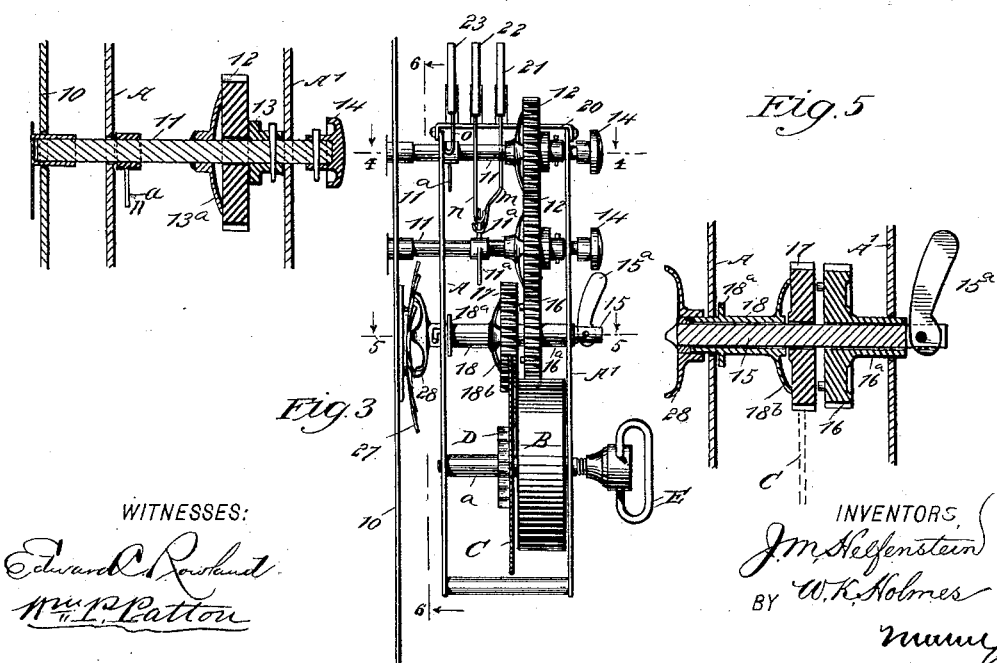
WITNESSES:
Edward C. Rowland
Wm. P. Patton
INVENTORS
J. M. Helfenstein
W. K. Holmes
BY
ATTORNEYS.
THE NORRIS PETERS CO., PHOTO-LITHO., WASHINGTON, D. C.

(No Model.) 2 Sheets—Sheet 2.
J. M. HELFENSTEIN & W. K. HOLMES.
TIME INDICATOR AND REGISTER.
No. 564,072. Patented July 14, 1896.
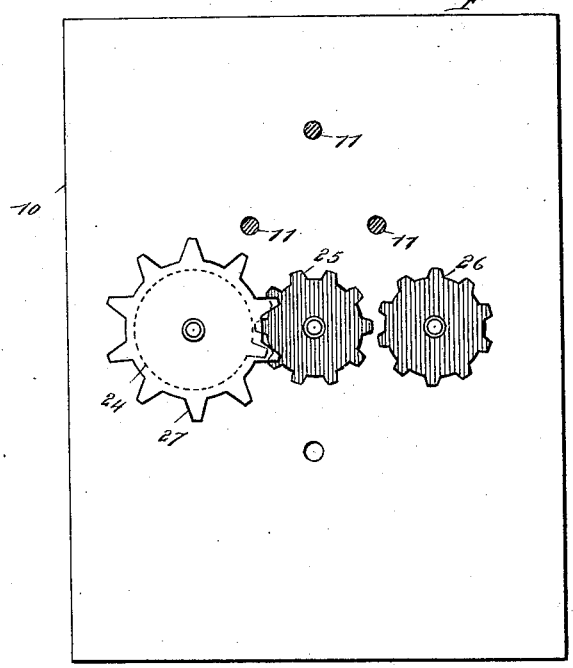
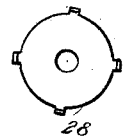
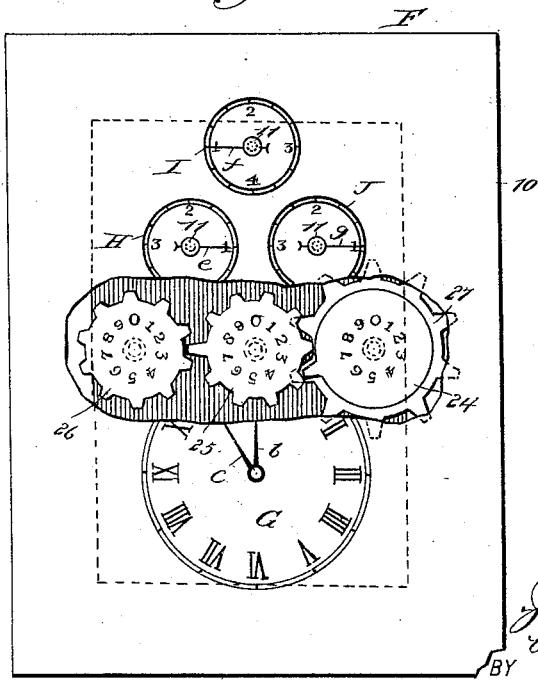
WITNESSES:
Edward Rowland
Wm. P. Patton
INVENTORS
J. M. Helfenstein
W. K. Holmes
BY
ATTORNEYS.
THE NORRIS PETERS CO., PHOTO-LITHO., WASHINGTON, D. C.

UNITED STATES PATENT OFFICE.

JAMES M. HELFENSTEIN, OF NEW YORK, AND WILLIAM K. HOLMES, OF BROOKLYN, NEW YORK.

TIME INDICATOR AND REGISTER.

SPECIFICATION forming part of Letters Patent No. 564,072, dated July 14, 1896.

Application filed June 1, 1895. Serial No. 551,383. (No model.)

*To all whom it may concern:*

Be it known that we, JAMES M. HELFENSTEIN, of New York city, in the county of New York, and WILLIAM K. HOLMES, of Brooklyn, in the county of Kings, State of New York, have invented a new and Improved Time Indicator and Register, of which the following is a full, clear, and exact description.

The invention relates to an improved indicator for denoting the lapse of predetermined periods of time, which may be consecutive and equal in duration or vary as to length.

The object of the invention is to provide a device of the character specified, which will be simple in construction, convenient to adjust, and which will afford reliable means for plainly displaying as well as for aurally announcing indications of time-lapses, the periods of which may be equal or varied in extent.

Our invention more particularly has for its object to afford a compact and accurately-adjustable mechanism, which may be employed in connection with the driving-gear of a clock, and be adapted to denote the lapse of minutes or hours which are to be devoted to different exercises in practicing lessons or performing elementary compositions of music, so that a predetermined period of time may be devoted to each exercise and time be economically consumed.

The invention also embraces the provision of a suitable registering device which will automatically register the aggregate periods of time devoted to exercises or other work, for which the indicator is used to note and determine time consumed in its performance.

The invention consists in the construction and combination of parts, as is hereinafter described, and indicated in the claims.

Reference is to be had to the accompanying drawings, forming a part of this specification, in which similar characters of reference indicate corresponding parts in all the views.

Figure 1 is a front view of a clock to which the improvement is applied. Fig. 2 is a rear view of the clock and the gear-supporting frame thereon, the latter being broken away and exposing parts of the improved indicator device geared with the main or driving wheel of the clock. Fig. 3 is a side elevation of the main portions of the improvement, seen in direction of the arrow 3 in Fig. 2. Fig. 4 is an enlarged sectional plan view of parts of the improvement, taken substantially on the line 4 4 in Fig. 3. Fig. 5 is an enlarged sectional plan view substantially on the line 5 5 in Fig. 3. Fig. 6 is a transverse partly-sectional view substantially on the line 6 6 in Fig. 3. Fig. 7 is a front elevation of the improved indicator in place on a clock-casing, the dial of the clock and the indicators being broken away to expose parts of the improvement; and Fig. 8 is a side view of a crown-wheel, which is a detail of the improvement.

The improved indicator device is especially well adapted for use to warn a player when practicing preparatory finger movement on a piano or organ that the limit of time allotted for such exercise has elapsed, and also to indicate the expiration of fractions of an hour or longer time which are to be devoted to running musical scales and then playing simple compositions or more difficult pieces of music; and as this is the preferred use for the improvement it will be described as applied for such a purpose.

In carrying into effect the features of the improvement it is preferred to arrange the working mechanism of the same in connection with the gearing of an ordinary clock and locate said mechanism, along with the clock-gear, in a casing which is portable and of comparatively small dimensions, so as to adapt the entire device for convenient portage.

The working parts of the improved time-indicator are preferably driven by the main-spring that drives the clock-gears, and as the latter are of well-known construction, to avoid a multiplicity of detail all such parts of the clock are omitted from the drawings, with the exception of the main spur-wheel of the clock-gearing, the driving-spring that is in direct connection with said spur-gear, and ratchet-gear to hold the latter wound.

In the drawings, A A' represent two parallel walls of the clock-frame held spaced apart by the usual means, and at a suitable point the drive-shaft $a$ is journaled in said frame-walls for the support of the spring B and main spur-gear C, the latter being secured in the ordinary manner to the spring, and also connected with the ratchet-wheel D, that is mounted on and secured to the drive-shaft for the retention of the spring in a wound condition when the shaft is rotated in a proper direction by the usual key or turn-button piece E. (Shown in Fig. 3.) On the casing F for the clock and improved indicator device a face-plate 10 is secured, which is properly spaced from the front frame-wall A to permit the introduction of parts of the indicator device, and on the outer surface of the face-plate the clock-dial G is produced or secured, having the usual graduations for indication of hours and minutes by the movement of the hands $b\ c$ of the clock that are driven by gearing of the latter.

As it is desirable to effect the independent notation of periods of time to be devoted for practicing the three musical exercises before mentioned, it is preferred to provide three dials therefor, which are represented at H, I, and J, in Figs. 1 and 7. The indicator-dials may be and preferably are graduated in a like manner, each being divided into twelve equal parts of one hour, so that the space between any two adjacent graduations of the indicator-dials will represent a time-lapse of five minutes. There is a shaft 11 provided for each dial H I J, which shafts are rotatably supported parallel with each other by an engagement with opposite perforations in the frame-walls A A'; and at their ends, which penetrate through central perforations in the said dials, an index-hand is secured, as shown at $e, f$, and $g$ in Figs. 1 and 7, these hands being designed to indicate on the graduations of the three dials.

For convenience in arrangement of gearing, as will be explained, the dials H I J and shafts 11 therefor are preferably disposed, as shown, locating the shafts at vertices of an imaginary triangle, so that the shaft for the dial I will lie above and equally distant from the other indicator-shafts 11. On each shaft 11 a toothed wheel 12 is secured, these wheels having an equal diameter and such a size as will permit the upper gear-wheel to mesh with the other two wheels, as shown in Fig. 2. The gear-wheels 12 are loosely mounted on their supporting-shafts, and have contact at the sides farthest from the dials H I J with the true faces of the friction-hubs 13, that are secured on the shafts 11 between the gear-wheels and rear frame-wall A', as shown in Fig. 4. The faces of the gear-wheels that are nearest the frame-wall A are in frictional contact with the elastic fingers of the keeper-plates $13^a$, which are notched to adapt them for effective service as friction-clamps, and the said plates have such an enforced contact with the wheels 12 as will adapt them to transmit rotary motion to the shafts 11 when either of the lower wheels 12 is rotated.

Each shaft 11 is projected through the frame-wall A' sufficiently at its rear to receive a turn-button 14, which turn-buttons are of such a diameter that when secured on the shafts they will be adapted for convenient manual adjustment so as to move the index-hands $e\ f\ g$ or either of them to indicate on a desired graduation of the dial or dials H, I, and J.

Below the wheels 12 a transverse shaft 15 is located, the said shaft being loosely introduced in alined perforations in the frame-walls A A', and, as shown in Figs. 3 and 5, a gear-wheel 16, like the wheels 12, is loosely mounted on the shaft 15, having a sleeve $16^a$ extended from it through the perforation provided to receive it in the frame-wall A', the said sleeve loosely fitting the perforation and thus providing a proper bearing for the shaft in the said wall A'. The gear-wheel 16 is of such a relative diameter and the shaft 15 is so located that said gear-wheel will have a meshed engagement with the lower pair of gear-wheels 12, as shown in Fig. 2. Between the wheel 16 and frame-wall A a toothed wheel 17 is loosely mounted on the shaft 15, and said wheel has a meshed engagement with the main spur-gear C, as shown clearly in Fig. 3 and indicated by dotted lines in Fig. 5.

A sleeve 18 is located on the shaft 15 between the gear 17 and front wall A, passing through and loosely fitting in the perforation of said wall made to receive it, thus affording a suitable bearing for the shaft 15 in said front wall. A collar $18^a$ is formed on the sleeve 18, and has frictional contact with the adjacent surface of the frame-wall A, and at its rear end is formed with a friction device $18^b$, comprising a disk whereon are a series of rearwardly-curved fingers having contact with the front face of the loose gear 17.

Preferably several short studs having equal length are projected from the front face of the gear-wheel 16 toward the adjacent surface of the loose gear 17, so that if the sleeves $16^a$ and 18 are moved toward each other the friction of the fingers $18^b$ and studs on the wheel 16 will cause the motion received by the wheel 17 from the spur-gear C to move the wheel 16 in the same direction with said wheel 17, and therefore actuate the gears 12. It may here be stated that the relative diameter of the described gears 12 16 and spur-gear C should be so proportioned that the speed given to the index-hands $e\ f\ g$ will adapt them to make a complete revolution on the dials H I J once in four hours, and the said dials are each graduated to indicate fractions of one hour, as before explained.

On the rear end portion of the shaft 15, which projects beyond the frame-wall A', a cam-lever $15^a$ is pivoted, so that when said lever is moved to impinge its cam projection on the projecting rear end of the sleeve $16^a$ the gear-wheel 16 will be forwardly moved and press the gear 17 against the friction-fingers on the disk $18^b$, the longitudinal movement of the shaft 15 enforcing such a frictional engagement of parts, which will adapt the gear 17 to transmit motion received from the wheel C to the gears 12 through the wheel 16, as before mentioned.

It is evident that, if desired, other means of adjustment may be provided for longitudinally moving and holding the shaft 15, as, for instance, an ordinary screw-nut may be made to engage the end of the shaft, which latter would in such cases be threaded to receive the nut, but it is preferred to use the cam-lever.

On the casing F a bell 19 is secured, preferably on the top wall, as shown in Figs. 1 and 2, and on the upper portion of the frame-walls A A′, on a bracket-plate 20 which is secured thereto, three bell-hammers 21 22 23 are supported, having their respective arms formed of resilient material. The bell-hammer arms may lie in the same transverse plane, and all have their ends opposite from the hammers affixed to the plate 20, and the length of said arms permits the hammers each to strike the edge of the bell when vibrated, and thus sound an alarm.

To the arms of the bell-hammers finger-pieces are affixed and depend, one from each arm, and, as shown in Figs. 2 and 3, said fingers $m$ $n$ $o$ have different relative positions thereon and different lengths, so that their lower ends, whereon hooks are preferably formed, may be successively engaged at proper intervals of time by the limbs $11^a$, which project singly from each shaft 11 in the path of the pendent fingers.

The operation of the indicator is as follows: Assuming that a pupil or other person is to practice first the finger movement for an hour or any fraction of the hour, at a predetermined time of the day, and after the finger exercise commence and practice running musical scales on the keys of a piano or other instrument of like character, and finally end the exercises with the playing of a piece of music of more or less difficult nature, devoting a limit of time within the capacity of the indicator-dials of each exercise, the index-hands $e$ $f$ $g$ are set for each dial at such a distance from zero or starting point on each dial as will cause the rotation of the shaft 11 of the dial used to mark the duration of practice of finger movement first in operation to impinge its limb $11^a$ on the pendent finger-piece $m$ and sound the bell when the interval of time set for practice of such exercise has expired, the movement of the actuating-shaft in a proper direction being produced by its geared connection with the spur-gear C, as before mentioned. When the operator has completed the initial exercise or finger movement and commences the running of scales on the musical instrument, the interval of time allotted for such practice will, at its expiration, be determined by the sounding of the bell a second time, as the index-hand then reaches the point where the fraction of an hour will terminate, which has been previously set for the running of musical scales. In like manner the period of time to be consumed in playing one or more pieces of simple or difficult music, and which is to be indicated on the third dial and also by sounding the bell, will be accurately determined by the movement of the index-hand over the proper graduations of the third dial, and the bell will be struck at its termination. It will be evident that if the length of time for practice of each or any of the exercises is required to exceed one hour the indicating-hands may be set to effect such a result.

As it is desirable to register the periods of time consumed in practicing exercises, as hereinbefore explained, for a number of days, a registering device is provided, which acts conjunctively with the indicator device and will now be described.

The face-plate 10 is apertured at three points, producing orifices $10^a$ of suitable area, preferably on the same horizontal line between the clock-dial G and indicator-dials above the latter. The "sight-orifices" $10^a$, as these apertures are for convenience termed, have such a separation as will permit the successive exposure through said orifices of numerals marked on the faces of three register-wheels 24, 25, 26, which are rotatably supported on center pivots that project from the rear face of the plate 10. The units-wheel 24 of the register has a single tooth, which at each revolution moves the next wheel 25 one tooth, and said wheel 25 has a single long tooth so relatively formed and located that it will engage one tooth of the third wheel 26 when the second wheel 25 has completed a revolution.

Preferably the register-wheels 24 25 26 have each ten teeth cut or otherwise formed in their peripheral edges, and ten numerals in regular order are formed on the face of each wheel, so spaced and arranged that when the registering-wheels are each successively given rotatable movements equal to one-tenth of a complete revolution, the digits from "0" to "9" inclusive, will first appear one after the other at the sight-orifice provided for the units-wheel, and after it has made a full revolution move the wheel 25 one tooth to expose an appropriate digit, and after the wheel 25 has completed its rotary movement the third wheel is so actuated by its geared connections that it will move one-tenth of a revolution and expose the proper numeral at the sight-orifice $10^a$.

On the units-wheel 24 a star-wheel 27 is secured, these joined wheels having a common center, and, as shown in Figs. 6 and 7, the star-wheel is provided with ten teeth that, on account of the greater diameter of the star-wheel, are radially projected exterior of the single tooth on the units-wheel.

A crown-wheel 28 has a secured engagement effected with the front end of the shaft 15, and the said wheel is preferably furnished with four teeth, that, by reason of the relative positions given to the star-wheel and crown-wheel, will adapt the laterally-projecting teeth of the latter-mentioned wheel to successively engage with the teeth of the star-wheel, and to facilitate such a meshing engagement the star-wheel is preferably dished or rendered concave, thus projecting its teeth more directly across the path of those on the crown-wheel.

It will be seen that the complete revolution of the shaft 15 will successively expose four digits in proper order that are on the units-wheel, and if the time selected for the three musical exercises should each equal twenty minutes then the one-fourth of a revolution of the counter-shaft 15 will register sixty minutes or one hour on the registering units-wheel. It will be evident that the length of time assigned for practicing each exercise, and that is indicated on the dials H I J, will determine the time value of the units registered on the wheel 24 and the other numerically-marked wheels of the registering device.

It is apparent that the units-wheel and its numerals, as viewed from the front of the face-plate 10, will be seen at the right-hand side in Fig. 1, and as the wheel 25 denotes a sum of ten units for each digit thereon, and the third wheel 26 sums of one hundred units for each numeral on it which is exposed at the sight-orifice $10^a$ opposite said wheel, the reading of any aggregate sum denoted by the figures exposed through the orifices in the face-plate 10 may be readily effected at any time, and the number of days, hours, or fractions of an hour consumed in practicing on a musical instrument or performing of different kinds of work that the improved indicator and register may be used to denote can be quickly and accurately ascertained.

Should it at any time be desired, the operation of the indicating and registering mechanism may be suspended by a suitable adjustment of the cam-lever $15^a$, so as to loosen the shaft 15 and let the wheel 17 rotate loosely.

Having thus described our invention, we claim as new and desire to secure by Letters Patent—

1. The combination, with a casing having a clock-dial on its face and a clock mechanism within the casing, of a series of time-indicating dials above said clock-dial, an index-hand coacting with each time-indicating dial, an alarm to be sounded when the time expires for which the indicating devices are set, gear connections between the indicating devices and clock mechanism whereby the indicating devices are simultaneously operated, and a registering device operated with the indicating devices, substantially as described.

2. The combination, with a casing having a clock-dial on its face, a plurality of time-indicating dials above said clock-dial, and a clock-motor mechanism within the casing, of parallel rotatably-supported shafts in the casing, each having one end extended through an indicating-dial, an index-hand on the projected end of each shaft and adapted to indicate on the graduations of an opposite indicating-dial, a clutch mechanism and gear-wheel on each shaft, means for normally adjusting each shaft independently of its gear-wheel, all said wheels being gear-connected, a longitudinally-adjustable shaft rotatable in the casing below the indicating-shafts, a gearing thereon which is in mesh with the indicating-gears and with a wheel of the clock-motor, and a registering device also operated from said motor-wheel, substantially as described.

3. The combination, with a casing having a clock-dial on its face, and a plurality of time-indicating dials above said clock-dial, and a clock-motor mechanism within the casing, of parallel rotatably-supported shafts in the casing, having one end extended through the center of an indicating-dial, an index-hand fixed on the projecting end of each shaft and adapted to indicate on the graduations of an opposite indicating-dial, a frictionally-clamped gear-wheel on each shaft, means for normally adjusting each shaft independently of its gear-wheel, all said wheels being gear-connected, a longitudinally-adjustable shaft rotatable in the casing below the indicating-shafts, and gearing thereon which is meshed with the indicating-gears and also with a spur-wheel of the clock-motor, substantially as described.

JAMES M. HELFENSTEIN.
WILLIAM K. HOLMES.

Witnesses:
JNO. M. RITTER,
WM. P. PATTON.